US011631277B2

(12) United States Patent
Wang et al.

(10) Patent No.: US 11,631,277 B2
(45) Date of Patent: Apr. 18, 2023

(54) CHANGE-AWARE PERSON IDENTIFICATION

(71) Applicant: KONINKLIJKE PHILIPS N.V., Eindhoven (NL)

(72) Inventors: Haibo Wang, Melrose, MA (US); Zibo Meng, Eindhoven (NL); Jia Xue, Eindhoven (NL); Cornelis Conradus Adrianus Maria Van Zon, Everett, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 291 days.

(21) Appl. No.: 16/760,072

(22) PCT Filed: Nov. 7, 2018

(86) PCT No.: PCT/EP2018/080378
§ 371 (c)(1),
(2) Date: Apr. 29, 2020

(87) PCT Pub. No.: WO2019/091988
PCT Pub. Date: May 16, 2019

(65) Prior Publication Data
US 2020/0356762 A1 Nov. 12, 2020

Related U.S. Application Data

(60) Provisional application No. 62/584,427, filed on Nov. 10, 2017.

(51) Int. Cl.
*G06V 40/16* (2022.01)
*G06K 9/62* (2022.01)
(Continued)

(52) U.S. Cl.
CPC .......... *G06V 40/172* (2022.01); *G06K 9/628* (2013.01); *G06K 9/6217* (2013.01); *G06N 3/08* (2013.01); *G06V 10/443* (2022.01)

(58) Field of Classification Search
CPC ...... G06K 9/6217; G06K 9/627; G06K 9/628; G06K 9/629; G06N 3/08; G06V 10/25;
(Continued)

(56) References Cited

U.S. PATENT DOCUMENTS

2019/0163955 A1* 5/2019 Asif ...................... G06T 7/0012

OTHER PUBLICATIONS

H. Li, J. Brandt, Z. Lin, X. Shen and G. Hua, "A Multi-level Contextual Model for Person Recognition in Photo Albums," 2016 IEEE Conference on Computer Vision and Pattern Recognition (CVPR), 2016, pp. 1297-1305, doi: 10.1109/CVPR.2016.145. (Year: 2016).*

(Continued)

*Primary Examiner* — Ross Varndell (57) ABSTRACT

A method for training a model, the method including: defining a primary model for identifying a class of input data based on a first characteristic of the input data; defining a secondary model for detecting a change to a second characteristic between multiple input data captured at different times; defining a forward link from an output of an intermediate layer of the secondary model to an input of an intermediate layer of the primary model; and training the primary model and the secondary model in parallel based on a training set of input data.

30 Claims, 5 Drawing Sheets

(51) Int. Cl.
*G06N 3/08* (2006.01)
*G06V 10/44* (2022.01)

(58) Field of Classification Search
CPC .... G06V 10/443; G06V 10/454; G06V 10/82; G06V 40/172
See application file for complete search history.

(56) References Cited

OTHER PUBLICATIONS

International Search Report and Written Opinion, International Application No. PCT/EP2018/080378, dated Feb. 19, 2019.
Haoxiang, L. et al., "A Multi-level Contextual Model for Person Recognition in Photo Albums", 2016, IEEE Conference on Computer Vision and Pattern Recognition.
Y. Wen, K. Zhang, Z. Li, and Y. Qiao. A discriminative feature learning approach for deep face recognition. In European Conference on Computer Vision, pp. 499-515, 2016.
A. Krizhevsky, I. Sutskever, and G. E. Hinton. Imagenet classification with deep convolutional neural networks. In Advances in neural information processing systems, pp. 1097-1105, 2012.
X. Wu, R. He, and Z. Sun. A lightened CNN for deep face representation. arXiv preprint arXiv:1511.02683, 2015.
K. He, X. Zhang, S. Ren, and J. Sun. Deep residual learning for image recognition. In Proceedings of the IEEE conference on computer vision and pattern recognition, pp. 770-778, 2016.
J. Deng, W. Dong, R. Socher, L.-J. Li, K. Li, and L. Fei-Fei. Imagenet: A large-scale hierarchical image database. In Computer Vision and Pattern Recognition, 2009. CVPR 2009. IEEE Conference on, pp. 248-255. IEEE, 2009.
N. Zhang, M. Paluri, Y. Taigman, R. Fergus, and L. Bourdev. Beyond frontal faces: Improving person recognition using multiple cues. In Proceedings of the IEEE Conference on Computer Vision and Pattern Recognition, pp. 4804-1813, 2015.
Glorot, Xavier, and Yoshua Bengio. "Understanding the difficulty of training deep feedforward neural networks." Proceedings of the thirteenth international conference on artificial intelligence and statistics. 2010.

* cited by examiner

CHANGE-AWARE PERSON IDENTIFICATION

TECHNICAL FIELD

Various exemplary embodiments disclosed herein relate generally to change-aware person identification.

BACKGROUND

Facial recognition software is widely used today. In an emergency department (ED), facial recognition may be used to identify patients. The identified patients may then be monitored in order to detect if the patient's health degrades in order to provide more immediate care.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for training a model, the method including: defining a primary model for identifying a class of input data based on a first characteristic of the input data; defining a secondary model for detecting a change to a second characteristic between multiple input data captured at different times; defining a forward link from an output of an intermediate layer of the secondary model to an input of an intermediate layer of the primary model; and training the primary model and the secondary model in parallel based on a training set of input data.

Various embodiments are described, further including after training, discarding layers occurring after the intermediate layer of the secondary model, to produce a trained model comprising the primary model and remaining layers of the secondary model.

Various embodiments are described, wherein the primary model includes at least one layer for extracting a feature representation of the first characteristic and the secondary model includes at least one layer for extracting a feature representation of the second characteristic.

Various embodiments are described, wherein the input data is image data.

Various embodiments are described, wherein the first characteristic is a face and the second characteristic is clothes.

Various embodiments are described, wherein the forward link is from a first layer of the secondary model to the second layer of the primary model.

Various embodiments are described, wherein the primary model includes four layers and the secondary model includes three layers.

Various embodiments are described, wherein the primary model includes a first BatchNorm+ReLU layer, a second BatchNow layer, a third BatchNow layer, and fourth Softmax layer.

Various embodiments are described, wherein the secondary model includes a first BatchNorm+ReLU layer, a second BatchNow layer, and a third Softmax layer.

Various embodiments are described, wherein first characteristic is an output from a face convolutional neural network (CNN).

Various embodiments are described, wherein second characteristic is an output from a clothes convolutional neural network (CNN).

Further various embodiments relate to a non-transitory machine-readable storage medium encoded with instructions for training a model, including: instructions for defining a primary model for identifying a class of input data based on a first characteristic of the input data; instructions for defining a secondary model for detecting a change to a second characteristic between multiple input data captured at different times; instructions for defining a forward link from an output of an intermediate layer of the secondary model to an input of an intermediate layer of the primary model; and instructions for training the primary model and the secondary model in parallel based on a training set of input data.

Various embodiments are described, further including: instructions for discarding layers, after training, occurring after the intermediate layer of the secondary model, to produce a trained model comprising the primary model and remaining layers of the secondary model.

Various embodiments are described, wherein the primary model includes at least one layer for extracting a feature representation of the first characteristic and the secondary model includes at least one layer for extracting a feature representation of the second characteristic.

Various embodiments are described, wherein the input data is image data.

Various embodiments are described, wherein the first characteristic is a face and the second characteristic is clothes.

Various embodiments are described, wherein the forward link is from a first layer of the secondary model to the second layer of the primary model.

Various embodiments are described, wherein the primary model includes four layers and the secondary model includes three layers.

Various embodiments are described, wherein the primary model includes a first BatchNorm+ReLU layer, a second BatchNow layer, a third BatchNow layer, and fourth Softmax layer.

Various embodiments are described, wherein the secondary model includes a first BatchNorm+ReLU layer, a second BatchNow layer, and a third Softmax layer.

Various embodiments are described, wherein first characteristic is an output from a face convolutional neural network (CNN).

Various embodiments are described, wherein second characteristic is an output from a clothes convolutional neural network (CNN).

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Various embodiments described herein relate to systems for person identification from image data where the systems are aware of changes to the person or environment as time progresses. For example, some embodiments present a Clothing Change Aware Network (CCAN) for person identification. CCAN concerns approaches that go beyond face recognition and particularly tackles the role of clothing to identification. When clothing from a pair of images are detected to be different, CCAN ignores clothing information while emphasizing other body contexts, and vice versa. In this way, CCAN handles the intuition that face and other clothing-unrelated contexts are more critical when a person is wearing different clothing. At the core of CCAN is a 3-layer neural network. With a pair of two person images as an input, the network simultaneously performs a verification task to detect clothing change, and an identification task to predict person identity. In practice, CCAN outperforms the way of stacking face and full body context features, and in experiments shows top results on the public People in Photo Album (PIPA) dataset.

Person identification is key for many application scenarios such as access control, video surveillance, abnormal event detection and criminal identification.

For scenarios where near-frontal faces can be clearly captured by a camera, face recognition plays a core identification role. A face recognition system is typically built with face detection, pose frontalization and similarity retrieval. With the wide usage of deep convolutional neural networks, 1:1 face verification and 1:N (N<1000) recognition were believed well addressed and ready for certain commercial applications. Challenges remain however for scenarios where frontal face images are not feasible or N is large. In this case, full-body recognition becomes complementary; this is widely studied but not yet well solved. While early efforts tend to use full-body features, recent work show that explicitly modeling local attributes greatly lead to boosted performance.

Various embodiments described herein address a specific type of person identification problem—dynamically registering a person in one uncontrolled scenario, and later on identifying the person in another uncontrolled scenario. The time interval between the registration and the identification period can be minutes to hours. In this case, many appearance changes caused by age do not exist. However, because both the registration and identification scenarios that are addressed here are uncontrolled, many environmental challenges including face visibility, body pose, illumination, and occlusion still occur, which together make the identification task equally difficult. Face recognition alone, due to the uncontrolled visibility of face, is inadequate, and complementary full-body recognition becomes particularly valuable. For convenience the addressed problem is named instant person identification.

Such an instant identification task may be used in many applications. A typical example is in hospitals. There is a recent trend to monitor the physiological status of a patient via cameras. Instant person identification was shown critical for setup aimed at simultaneous multiple patient monitoring. Similar applications include hotels, banks and restaurants. In these scenarios, persons, typically customers, first go to a reception desk for registration. Here a camera is installed to capture photos of the customers as gallery set. Later on, these persons will stay in an area waiting for their service. With another camera capturing probe photos, instant person identification could help physiological status monitoring, facial expression recognition, and/or abnormal event detection on a per customer basis.

To handle the identification problem, intra-person variations such as lighting, pose and clothing must be alleviated so that inter-person differences can be enlarged. The technology of deep convolutional neural networks (CNN) has been shown able to model the deviations such as face angle, body pose, and illumination. However, clothing change is rarely explicitly modeled. In the aforementioned scenarios clothing is actually changed very often—for example, a patient/customer often takes a jacket hat or scarf off or puts one on, due to the temperature difference between outdoor and indoor environments. When equally leveraging body and face features, which is the most typical approach in literature, different clothing features tend to mis-classify a single person as two different ones. In this case, face features should play a more critical role while body features should be less emphasized. Recent efforts address the relative importance of face and body by learning weights from training data. This needs plenty of training data and still does not model clothing change explicitly. The existing methods to detect a clothing change need a clear segmentation of clothing from the rest of body. However, because clothing is densely coupled with body contexts such as gesture, hand pose, and body shape, clothing segmentation leads to context loss.

Various embodiments disclosed herein present a method, called Clothing Change Aware Network (CCAN), to explicitly model clothing change for facial, clothing, and body context fusion for person identification. When clothing from a pair of images are detected to be different, CCAN automatically uses the features around the clothing-uncovered regions, and vice versa. In this way, CCAN handles the intuition that clothing context should be ignored when a person was found to have changed clothing. At the core of CCAN is a 3-layer neural network. With a pair of two person images as input, the network simultaneously performs a verification task to detect clothing change, and an identification task to predict person identity. The two tasks are coupled in the network in this way—on one hand, when clothing is not changed, other unchanged contexts should be learned for recognition; otherwise, clothing and other cues should be both picked. In practice, CCAN was found to outperform the way of simply stacking face and body features in all the experiments carried out, and shows top results on the public People in Photo Album (PIPA) dataset.

Besides the 3-layer fusion network, CCAN contains two other deep learning models to explicitly convert face and body patches into feature vectors, respectively. Both models are CNN models, but each model has their own features.

First, for face representation, the efficient Center-Loss CNN model is improved, by integrating the maximum feature map (MFM) concept to retain distinctive feature maps in intermediate layers. This significantly reduces model size while maintaining high model discriminativity. Second, random local patches are extracted to capture clothing and other body contexts, and train a single deep learning model to convert these patches. Compared to other approaches, this disclosed approach gets rid of the various attribute detections and uses fewer deep learning models.

Figure 1:
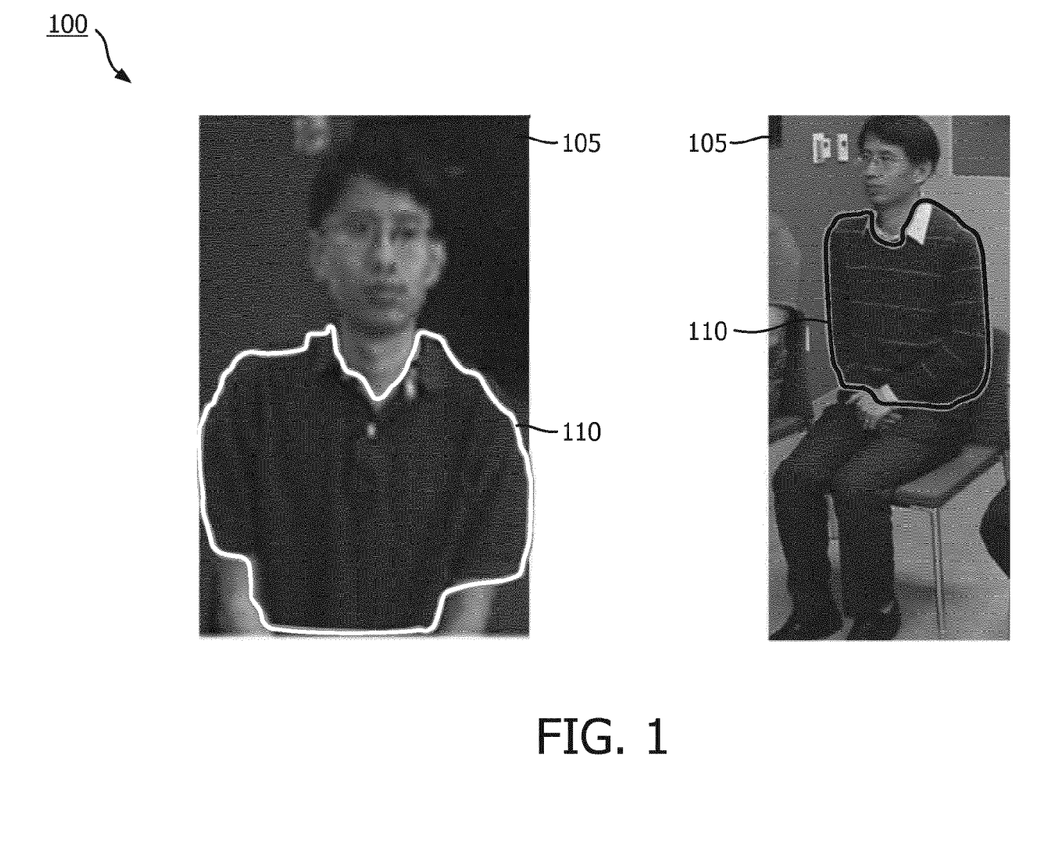
FIG. 1 illustrates two different pictures of the same person.

FIG. 1 illustrates two different pictures 105 of the same person. As can be seen in the two pictures 105, the face of the person shown is the same, but the person is wearing different clothes 110 in the two pictures. This is a situation where the CCAN will be able to determine that the same person is in the two pictures 105 even thought the clothing is different.

While various embodiments are described herein with respect to accounting for clothing changes, various other applications for the principles disclosed herein will be apparent. For example, in the realm of person identification based on contextual clues in image data, similar approaches may be employed to account for changes to context. For example, various embodiments may utilize these principles to account for changes to hair (e.g., due to a haircut, putting on a hat, or tying hair back), the environment (e.g., due to addition or removal of items in the vicinity of the person such as books, newspapers, magazines, or handbags), posture, companions (e.g., other humans or animals in the vicinity of the person), or other contextual information that may be used in various time frames for identifying a person. This may be further expanded to include other situations where two or more detection features are related. For example, a person's image, voice or patient tag may all be used to improve the detection of a person.

Figure 2:
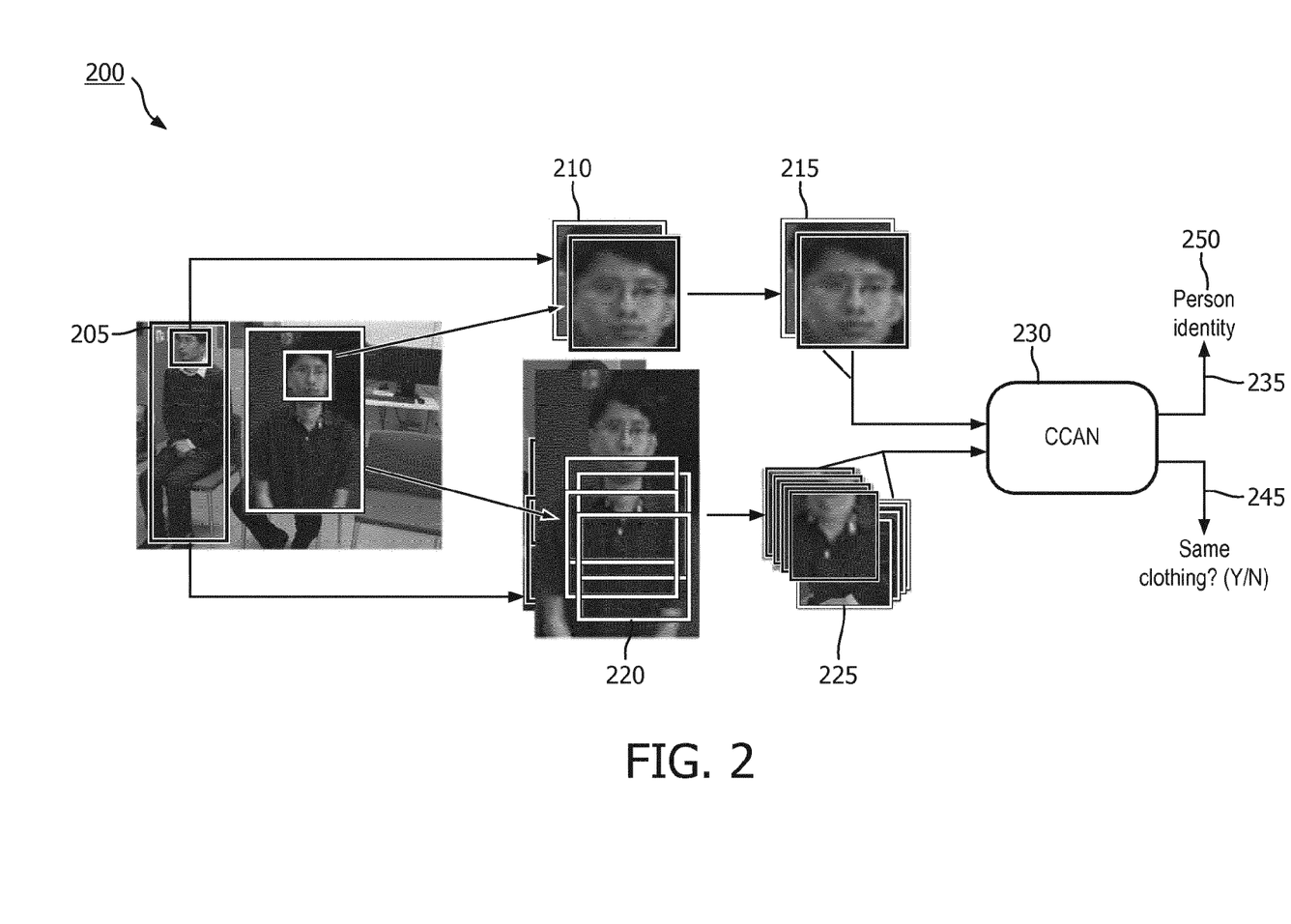
FIG. 2 illustrates the workflow of a CCAN system.

FIG. 2 illustrates the workflow of a CCAN system. Various embodiments of the CCAN system may include three modules: a face convolutional neural network (CNN) model 210 for face representation, a body CNN model 220 for body context representation; and a CCAN 230 including a 3-layer neural network for the prediction of clothing change and identity. The face CNN model 210 receives input images 205 and produces face features 215 indicative of a face representation. The body CNN model 220 also receives the input images 205 and produces body features 225. The CCAN receives the face features 215 and the body features 225 and outputs the identity 235 of the person in the picture and whether the person in the picture is wearing the same clothes 245.

An embodiment of the face CNN model 220 will now be described. Table 1 summarizes the architecture of the face CNN model 220 employed for learning face representation. Table 1 lists the layers used, the output shape of the layer, and filter size, stride size, and pad size (if any). The architecture uses residual shortcuts to speed up gradient back-propagation. Other approaches use Rectified Linear Units (Reclus) as activation functions, which keeps all the positive responses on a feature map while suppressing all negative ones. However, because negative responses are also informative, the ReLUs are replaced with the Max-Feature-Map (MFM) function in some embodiments to retain information from both the positive and negative sides. MFM operates on any two subsets of output feature maps.

TABLE 1

| Layers | Output Shape | Filter/Stride, Pad |
|---|---|---|
| Input | 3 × 100 × 100 | — |
| Convolution | 32 × 98 × 98 | 3 × 3/1, 0 |
| MFM | 16 × 98 × 98 | — |
| Convolution | 32 × 98 × 98 | 1 × 1/1, 0 |
| Convolution | 64 × 96 × 96 | 3 × 3/1, 0 |
| MFM | 32 × 96 × 96 | — |
| Max Pooling | 32 × 48 × 48 | 2 × 2/2, 0 |
| Residual Block | 32 × 48 × 48 | $\begin{bmatrix} 3\times3/1, 1 \\ 3\times3/1, 1 \end{bmatrix} \times 1$ |
| Convolution | 128 × 48 × 48 | 3 × 3/1, 1 |
| MFM | 64 × 48 × 48 | — |
| Max Pooling | 64 × 24 × 24 | 2 × 2/2, 0 |
| Residual Block | 64 × 24 × 24 | $\begin{bmatrix} 3\times3/1, 1 \\ 3\times3/1, 1 \end{bmatrix} \times 2$ |
| Convolution | 256 × 22 × 22 | 3 × 3/1, 0 |
| MFM | 128 × 22 × 22 | — |
| Max Pooling | 128 × 11 × 11 | 2 × 2/2, 0 |
| Residual Block | 128 × 11 × 11 | $\begin{bmatrix} 3\times3/1, 1 \\ 3\times3/1, 1 \end{bmatrix} \times 5$ |
| Convolution | 512 × 9 × 9 | 3 × 3/1, 0 |
| MFM | 256 × 9 × 9 | — |
| Max Pooling | 256 × 5 × 5 | 2 × 2/2, 0 |
| Residual Block | 256 × 5 × 5 | $\begin{bmatrix} 3\times3/1, 1 \\ 3\times3/1, 1 \end{bmatrix} \times 3$ |
| Fully Connected | 512 | — |

Figure 3:
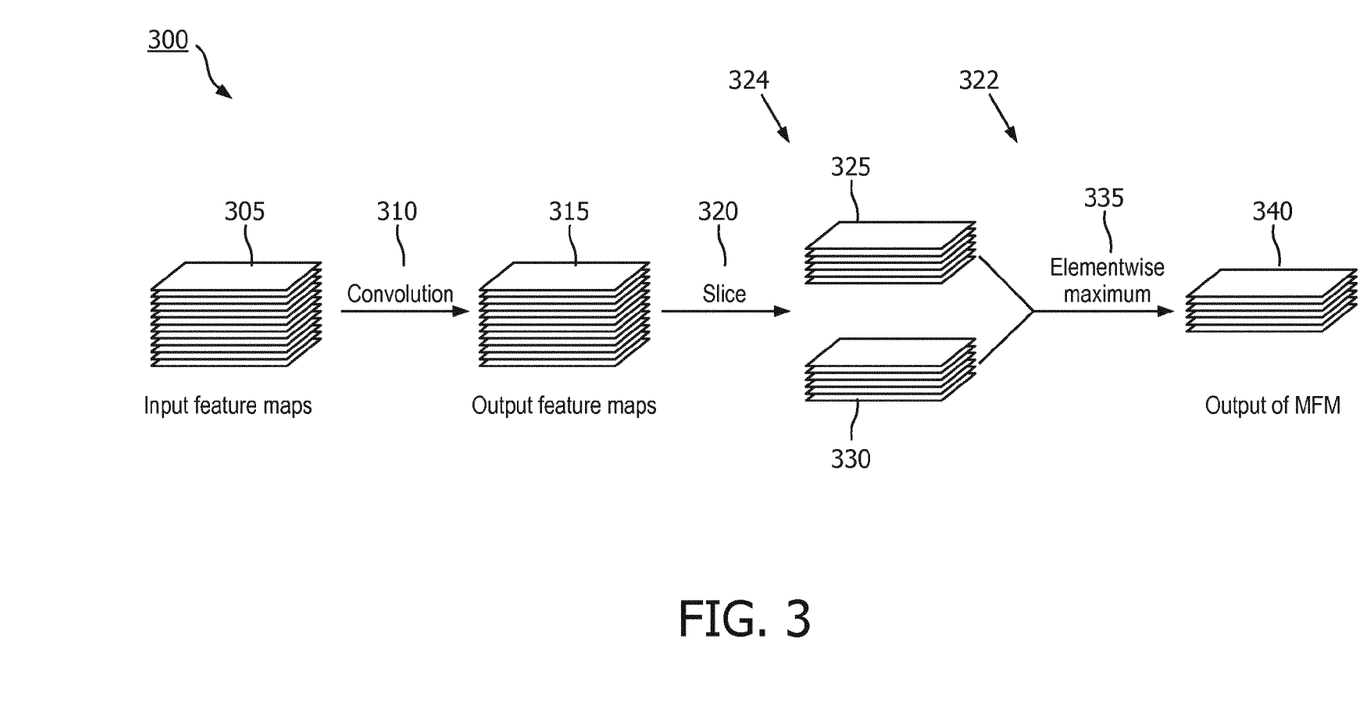
FIG. 3 illustrates the operation of an MFM.

FIG. 3 illustrates the operation of an MFM. The MFM 300 receives input feature maps 305 and applies a convolution operation 310 to the input features maps 305 to produce the output features maps 315. The output feature maps 315 are sliced 320 into first slice 325 and a second slice 330. An elementwise maximum operation 335 is applied to the first slice 325 and the second slice 330 to produce the MFM output 340.

In further detail, given a set of input feature maps $X \in \mathbb{R}^{N \times H \times W}$, where N is the number of feature maps, and H and W are the height and width of the maps, then MFM is defined as $$y_{i,j}^n = \max(x_{i,j}^n, x_{i,j}^{n+N/2})$$

where $y_{i,j}^n$ is the output value on the $n^{th}$ feature map of MFF at location (i,j) and $x_{i,j}^n$ is the value on the $n^{th}$ feature map in X at location (i,j). Since MFF quickly reduces the number of feature maps by ½, right after the first MFM layer as shown in Table 1, a 1×1 convolutional layer is applied to smooth the reduction. This layer increases the feature maps from 16 back to 32. But since the 1×1 layer is computationally intensive, it is only applied once.

Figure 4:
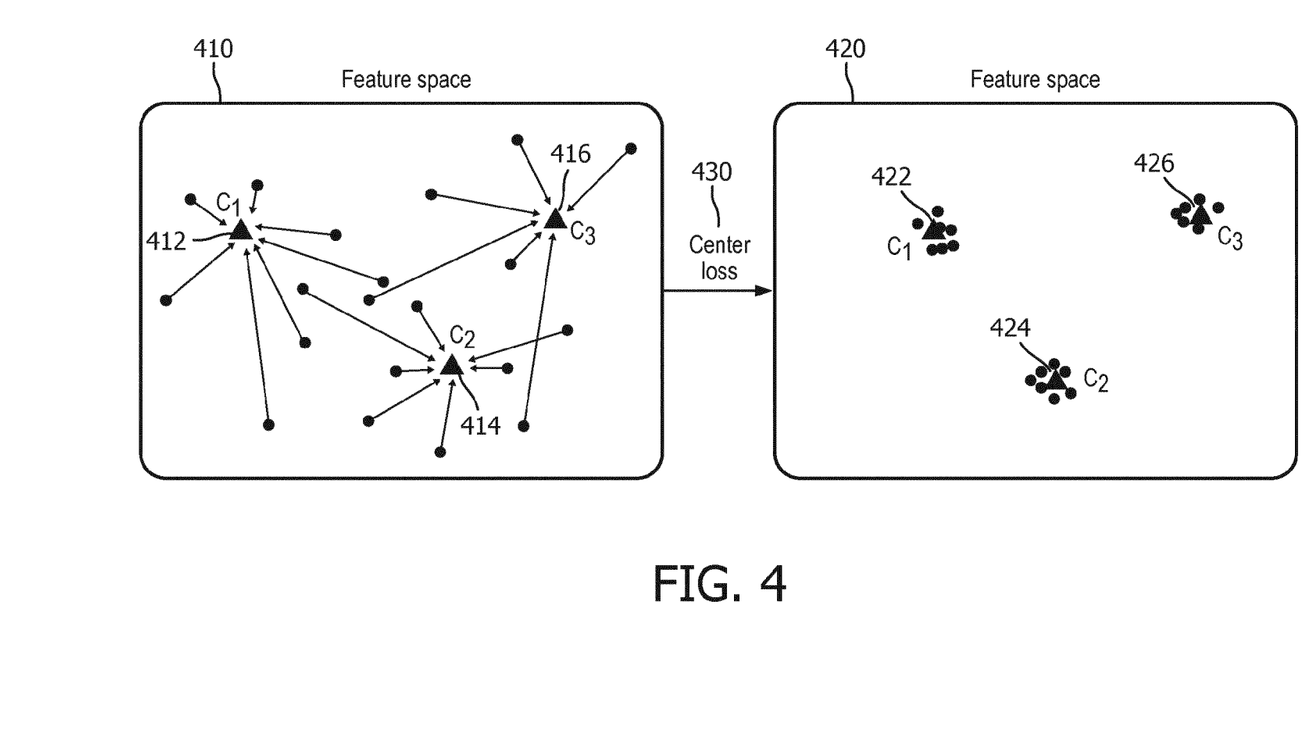
FIG. 4 illustrates the concept of center loss.

The loss function employed in various embodiments is a combination of Softmax and Center loss. Center loss assigns a center to each class and enforces the samples within each individual class to go as close as possible to their center. Together with Softmax, center loss minimizes intra-class variations while maximizing inter-class differences. FIG. 4 illustrates the concept of center loss, where a feature space 410 includes three clusters 412, 414, and 416. After center loss 430 is applied by assigning a center for each class and pulling each sample towards their assigned center, the resulting three clusters 422, 424, and 426 are much more tightly bunched. As compared with other losses such as contrastive loss and tripleloss, center loss does not need explicit image pairing or tripletting, thus quadratically or cubically reducing the number of the training image grows. The loss particularly fits the problem of open-set identification, where hard thresholding is needed to predict identity on the presence of distractors. Table 2 verifies the role of center loss on a small-scale open set with the large-scale Youtube Faces database as distractors.

TABLE 2

Close-set (Top-1 matching)

| Method | Accuracy |
|---|---|
| VGG-face | 80.0% |
| LightenCCN-B | 96.7% |
| LightenedCNN-C | 90.0% |
| CCAN | 100.0% |

Open-set (Top-1 matching at FPR = 0)

| Method | False Negatives | Accuracy |
|---|---|---|
| VGG-face | 40 | 98.8% |
| LightenedCCN-B | 6 | 99.8% |
| LightenedCNN-C | 8 | 99.7% |
| CCAN | 3 | 99.9% |

In this implementation, the face CNN model 210 takes a 112×112 cropped face image as input. The face image is first aligned using the detection and alignment tools provided in Dlib 1. When the alignment fails, the unaligned face images are kept for both training and testing. Then 100×100 patches are randomly cropped from the 112×112 input and fed into the network. Each pixel (in [0, 255]) in the RGB images is normalized by subtracting 127.5 then dividing by 128. The dataset used for training may be MegaFace that includes 4.7 million images of 672 thousand identities. In practice, only the 20,000 identities are selected that have the most instances, resulting in roughly 1.2 million training images. The model is learned for 1 million iterations using an initial learning rate of 0.01 and reduced by 0.1 every 200,000 iterations. On a NVIDIA Titan X card, the training takes 180 hours. The size of the trained model is 14.4M, only 1/40 of that of VGG-face and comparable to the Lightended models.

Now the body CNN model 220 will be described. The body region has rich contextual information such as clothing style, gesture, and hand poses. To capture these rich contexts, as shown in FIG. 2, full body detection is performed, and 4 patches are randomly cropped out of each detected body image. Random cropping saves the need of training various local attribute detectors, which reduces the number of used models. Meanwhile, with a high probability, random cropping covers both clothing and clothing independent contexts, which is critical for the subsequent clothing change aware feature fusion.

A deep learning model is used to represent each cropped body patch. For this purpose, a ResNet-50 model is fine-tuned, which was pretrained on ImageNet. First, a fully-connected layer is added on top of the global average pooling layer of the ResNet-50 model. This helps to reduce the output feature dimension from 2048 to 512. Then a classification layer is added on the top. Data for the fine tuning is the training split of the PIPA dataset.

Input to the fine-tuned network is 4 cropped patches of the size of 224×224. Given a detected body image, first its short side is resized to 256 while keeping its Height/Width ratio. Then random crops are generated, by arbitrarily sampling a [0.8, 1.0] portion of the resized image and picking a random aspect ratio out of [3/4, 4/3]. A batch size of 64 is used to fine-tune the pre-trained ResNet-50 model. The learning rate is initialized at 0.01, and reduced by 0.1 after 80 epochs. The fine tuning takes 150 epochs. In the test phase, the used feature representation is the output of the added fully connected layer, which is 512-dimensional. Thus, the final length of body features is 512×4=2048.

Now the clothing change aware identification performed by the CCAN 230 will be described. Once the face context features 215 and body context features 225 are generated, they are fed into the subsequent clothing CCAN 230, which performs identity recognition and clothing change detection simultaneously. The two tasks are coupled in a way that CCAN 230 learns shared features that are identity friendly, especially when clothing change is detected. Identity recognition is a multi-class classification problem with the output corresponding to the number of identities. Clothing change detection is a verification task, with the output being changed or not changed. To join the two tasks, specific image pairs are used as inputs. Below the CCAN 230 will be described in detail.

Figure 5:
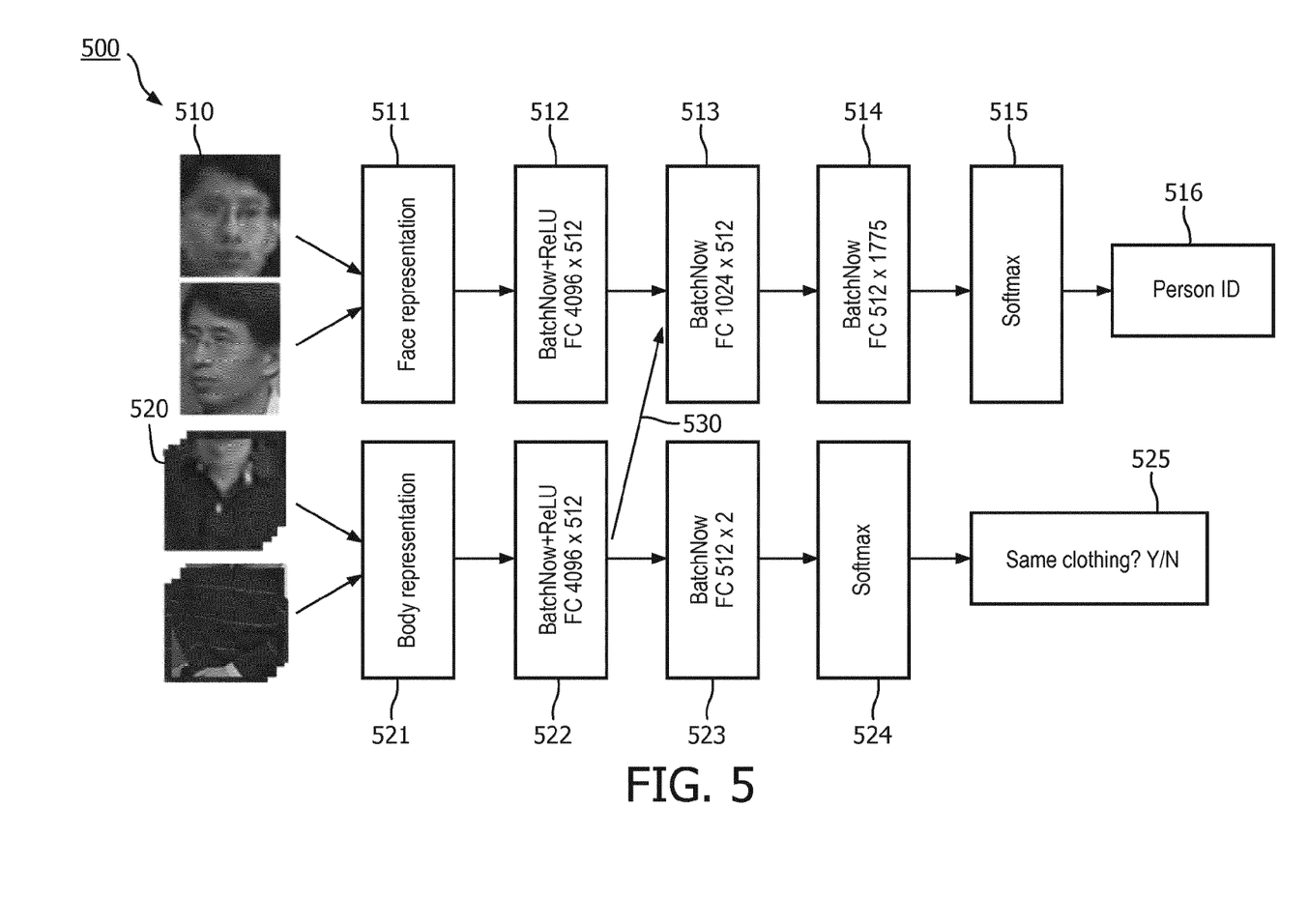
FIG. 5 illustrates the architecture of CCAN.

FIG. 5 illustrates the architecture of CCAN 230. There are two parallel streams corresponding to the two tasks. The first stream is a 4-layer fully-connected network performing person identification. The output length corresponds to the number of identities in training set. More specifically, the first stream receives as inputs face features 511 extracted from images of faces 510 received. The face features 511 may be output from the face CNN model 210. The first layer 511 is a BatchNorm+ReLU with an output size of 4096×512. The second layer 512 receives the output of the first layer 511 and is a BatchNorm with an output of size 1024×512. The second layer 511 also receives an output from a layer 522 of the second stream, which will be further described below. The third layer 514 receives the output of the second layer 512 and is a BatchNorm with an output of size 512×1775. The fourth layer 515 is a Softmax that receives the output of the third layer 514 and produces an output that is the identification of the person 516 in the input face image.

The second stream is a 3-layer fully-connected network performing clothing change verification. The output length is 2, for YES and NO. More specifically, the second stream receives as inputs body features 521 extracted from images of bodies 520 received. The body features 521 may be output from the body CNN model 220. The first layer 521 is a BatchNorm+ReLU with an output size of 4096×512. The second layer 522 receives the output of the first layer 521 and is a BatchNorm with an output of size 512×2. The third layer 524 receives the output of the second layer 512 and is a Softmax that receives the output of the second layer 523 and produces an output 525 that indicates if the person in the input images have the same clothing.

The two networks are associated by connecting the output of the first layer 522 of the second stream to the input of second layer 513. Consequently, the identity and clothes information are coupled to influence all the layers through gradient back-propagation. That is during training, back-propagation causes all of the layers to be linked. In this way, the model learns identity-friendly features, which may be independent of clothing if the clothing changes. Also, in situations where the face may not be clearly seen or easily matched, but the clothing is still the same, the person in the picture may still be correctly identified based upon the same clothing.

The CCAN is trained using as an input a pair of two facebody-stacked features of the same person. If the paired features have differently labeled clothing, they are a positive instance; otherwise, they are a negative instance. A batch size of 128 may be used, which is actually 128 feature pairs. To form these pairs, first 128 features are randomly selected out of the training set. Based on the identity associated with each selected feature, then another feature is randomly selected associated with the same identity to form a training pair. If a person only has one feature, the feature is duplicated to form a pair. During training of the CCAN, the back-propagation and the cross linkage between the face stream and the body stream helps the CCAN to learn how to correctly identify individuals even when their clothing changes.

In the test phase of the CCAN, there are gallery and probe sets, both of which are never used for training. Therefore, the predicted identity of CCAN cannot be relied upon. Instead only the intermediate output is used as a feature representation. Specifically, the output of the second layer 513 of the first stream is used as features. The gallery features may be pre-extracted. Each probe feature is then matched against the gallery set, and the best match will be picked. Similar to training, testing needs a pair of two input face-body-stacked features of the same individual from either the probe or the gallery. In the training phase, the order of the 4 input body features is not considered. Therefore, to enhance performance, a comprehensive image pairing is done. Let $\{p\}_{1:N}$ denote the facebody-stacked feature set belonging to an individual. Each time, first a feature $p_i$ with i from 1 to N is picked. Then $p_i$ is sequentially paired with $p_j$ with j from 1 to N, and $(p_i; p_j)$ is fed into CCAN for feature extraction. This results in N such feature vectors. Subsequently these N features are averaged, and the averaged vector is treated as the representation of $p_i$. For the individual having only one face-body-stacked feature, the feature is simply duplicated twice for pairing. In the end, N feature vectors result corresponding to the N face-body-stacked inputs. In experiments N differs for different identities. Two different decision metrics were used for the probe-gallery set matching:

averaging: all features of each identity are averaged, and an average-average vector matching is performed; and majority voting: each feature of a probe identity is matched against each individual feature of each gallery identity; the gallery identity which is most often voted in the individual matchings, is the best match.

In an example implementation, the training data is the training split of the PIPA dataset. The clothes information is manually labelled for all the 36,352 images with 1775 identities. Parameters of the model are initialized with the Xavier distribution. The initial learning rate is 0.01, and reduced by 0.1 after 12 epochs. In this example, the training takes 25 epochs. On a NVIDIA Titan 1080ti card, the training runs less than 1 hour.

The CCAN example described herein may be expanded to add a third or more feature(s) for consideration in person identification. For example, the third feature will look for a head changes, that may include a change in a person's hair or the putting on or removing a hat. This would result in a third stream being added to the structure of FIG. 5 with the third stream having an output of one-layer input into a layer of the first stream. Again, during training, the back-propagation will link the features to allow for improved identification of an individual even when clothing, hair, or wearing of a hat changes.

The CCAN architecture illustrated in FIG. 5 was shown to result in improved person detection when clothing changes. But more layers or different layers may also be used depending up the specific features that are to be identified. Also, the link between the streams related to the different features may be at different layers than those shown in FIG. 5. The improved identification is due to the linkage between the streams processing the two related features and the back-propagation during training that links the two features together.

The CCAN provides various technological benefits in identifying individuals even when their clothing changes. Further, the CCAN solves the problem identifying individuals even when their faces are not in an optimal position to accurately identify the individual, but the if their clothing has not changed the individual may still be correctly identified. Further, the CCAN may be applied to other feature detection problems using two linked features.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described above.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for training a model, the method comprising:
defining a primary model for identifying a class of input data based on a first characteristic of the input data;

defining a secondary model for detecting a change to a second characteristic between multiple input data captured at different times;
defining a forward link from an output of an intermediate layer of the secondary model to an input of an intermediate layer of the primary model;
training the primary model and the secondary model in parallel based on a training set of input data; and
after the training, discarding layers occurring after the intermediate layer of the secondary model, to produce a trained model comprising the primary model and remaining layers of the secondary model.

2. The method of claim 1, wherein the primary model includes at least one layer for extracting a feature representation of the first characteristic and the secondary model includes at least one layer for extracting a feature representation of the second characteristic.

3. The method of claim 1, wherein the input data is image data.

4. The method of claim 1, wherein the first characteristic is a face and the second characteristic is clothes.

5. The method of claim 4, wherein the forward link is from a first layer of the secondary model to the second layer of the primary model.

6. The method of claim 5, wherein the primary model includes four layers and the secondary model includes three layers.

7. The method of claim 5, wherein the primary model includes a first BatchNorm+ReLU layer, a second BatchNow layer, a third BatchNow layer, and fourth Softmax layer.

8. The method of claim 7, wherein the secondary model includes a first BatchNorm+ReLU layer, a second BatchNow layer, and a third Softmax layer.

9. The method of claim 4, wherein first characteristic is an output from a face convolutional neural network (CNN).

10. The method of claim 9, wherein second characteristic is an output from a clothes convolutional neural network (CNN).

11. A non-transitory machine-readable storage medium encoded with instructions for training a model, comprising:
instructions for defining a primary model for identifying a class of input data based on a first characteristic of the input data;
instructions for defining a secondary model for detecting a change to a second characteristic between multiple input data captured at different times;
instructions for defining a forward link from an output of an intermediate layer of the secondary model to an input of an intermediate layer of the primary model; and
instructions for training the primary model and the secondary model in parallel based on a training set of input data; and
instructions for discarding layers, after the training, occurring after the intermediate layer of the secondary model, to produce a trained model comprising the primary model and remaining layers of the secondary model.

12. The non-transitory machine-readable storage medium of claim 11, wherein the primary model includes at least one layer for extracting a feature representation of the first characteristic and the secondary model includes at least one layer for extracting a feature representation of the second characteristic.

13. The non-transitory machine-readable storage medium of claim 11, wherein the input data is image data.

14. The non-transitory machine-readable storage medium of claim 11, wherein the first characteristic is a face and the second characteristic is clothes.

15. The non-transitory machine-readable storage medium of claim 14, wherein the forward link is from a first layer of the secondary model to the second layer of the primary model.

16. The non-transitory machine-readable storage medium of claim 15, wherein the primary model includes four layers and the secondary model includes three layers.

17. The non-transitory machine-readable storage medium of claim 15, wherein the primary model includes a first BatchNorm+ReLU layer, a second BatchNow layer, a third BatchNow layer, and fourth Softmax layer.

18. The non-transitory machine-readable storage medium of claim 17, wherein the secondary model includes a first BatchNorm+ReLU layer, a second BatchNow layer, and a third Softmax layer.

19. The non-transitory machine-readable storage medium of claim 14, wherein first characteristic is an output from a face convolutional neural network (CNN).

20. The non-transitory machine-readable storage medium of claim 19, wherein second characteristic is an output from a clothes convolutional neural network (CNN).

21. A system for person identification from image data, the system comprising:
a processor;
a non-transitory computer readable medium that stores instructions, which when executed by the processor, causes the processor to:
define a primary model for identifying a class of input data based on a first characteristic of the input data;
define a secondary model for detecting a change to a second characteristic between multiple input data captured at different times;
define a forward link from an output of an intermediate layer of the secondary model to an input of an intermediate layer of the primary model;
train the primary model and the secondary model in parallel based on a training set of input data; and
after the primary model is trained, discard layers occurring after the intermediate layer of the secondary model, to produce a trained model comprising the primary model and remaining layers of the secondary model.

22. The system of claim 21, wherein the primary model comprises at least one layer for extracting a feature representation of the first characteristic and the secondary model includes at least one layer for extracting a feature representation of the second characteristic.

23. The system of claim 21, wherein the input data is image data.

24. The system of claim 21, wherein the first characteristic is a face and the second characteristic is clothes.

25. The system of claim 24, wherein the forward link is from a first layer of the secondary model to the second layer of the primary model.

26. The system of claim 25, wherein the primary model includes four layers and the secondary model includes three layers.

27. The system of claim 25, wherein the primary model includes a first BatchNorm+ReLU layer, a second BatchNow layer, a third BatchNow layer, and fourth Softmax layer.

28. The system of claim 27, wherein the secondary model includes a first BatchNorm+ReLU layer, a second BatchNow layer, and a third Softmax layer.

29. The system of claim 24, wherein first characteristic is an output from a face convolutional neural network (CNN).

30. The system of claim 29, wherein second characteristic is an output from a clothes convolutional neural network (CNN).

\* \* \* \* \*